Patented Mar. 15, 1949

2,464,430

UNITED STATES PATENT OFFICE 2,464,430

PRODUCTION OF FORMALS OF PENTAERYTHRITOL

Robert H. Barth, Ridgewood, and John E. Snow, Hasbrouck Heights, N. J., assignors to Heyden Chemical Corporation, New York, N. Y., a corporation of Delaware No Drawing. Original application January 12, 1944, Serial No. 517,990. Divided and this application October 10, 1945, Serial No. 621,588

8 Claims. (Cl. 260—338)

This invention relates to the isolation and conversion of byproducts consisting of formals obtained in the preparation of pentaerythritol and ethers of pentaerythritol by the reaction of acetaldehyde, formaldehyde and alkali. In one of its more specific aspects the invention relates to a process for the conversion of one such formal, namely, formaldehyde bipentaerythrityl acetal, to pentaerythritol and pentaerythritol cyclic monoformal.

The present application is a division of application Serial No. 517,990, filed January 12, 1944, by Robert H. Barth, Toivo R. Aalto, John E. Snow and Hilding R. Johnson, which was abandoned after filing of this application.

In the production of pentaerythritol and its ethers, dipentaerythritol and tripentaerythritol, there are formed at least two other compounds, one of which has not heretofore been identified or disclosed. Both of these compounds are formals, one of which, formaldehyde bipentaerythrityl acetal, melts at 125° C. to 140° C. when practically free from pentaerythritol. When freed nearly entirely from pentaerythritol, it melts at 125° C. to 135° C. It is soluble in water in all proportions, being salted out of solution by the sodium formate which is usually present in the reaction liquor. It occurs as a component of technical pentaerythritol along with dipentaerythritol. From carbon and hydrogen determinations, and from the hydroxyl values, molecular weights, and saponification values, both of the compound and of its hexaacetate, this compound is the formaldehyde bipentaerythrityl acetal having the formula:

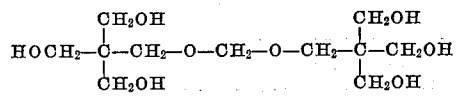

Throughout this specification and in the claims this linear formal of pentaerythritol, which has not been heretofore described, will be referred to as formaldehyde bipentaerythrityl acetal.

The second of the two compounds which are present in the reaction liquor obtained in the production of pentaerythritol and ethers of pentaerythritol, is pentaerythritol cyclic monoformal, which has the formula:

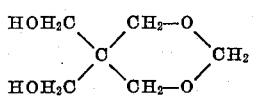

This compound, which was disclosed by Skrabal and Kalpasanoff in Berichte, 1927, vol, 61B, pages 55 to 57, is very difficult to crystallize. It may be obtained from the end liquors of pentaerythritol production, either (1) by azeotropic dehydration of said liquors with benzene or toluene followed by crystallization or (2) by acetylation of the end liquors and distillation of the resulting diacetate therefrom; the resulting diacetate is thereafter hydrolyzed to produce pentaerythritol cyclic monoformal. When substantially pure, pentaerythritol cyclic monoformal has a melting point of 55° to 60° C. (Reported melting point is 60° C.)

It is an object of the present invention to provide a process for the production of pentaerythritol cyclic monoformal.

Another object of the invention is to provide a process for the extraction of formaldehyde bipentaerythrityl acetal, a compound not heretofore described, from pentaerythritol process end liquors.

A further and more specific object of the present invention is to provide a process for the conversion of formaldehyde bipentaerythrityl acetal to pentaerythritol cyclic monoformal.

Other objects of the present invention, some of which are referred to more specifically hereinafter, will be apparent to those skilled in the art to which the present invention pertains.

We have discovered that formaldehyde bipentaerythrityl acetal can be isolated from technical pentaerythritol by extraction with n-propanol, isopropanol, butyl acetate, or other organic solvents in which it is soluble and in which neither pentaerythritol nor dipentaerythritol is appreciably soluble. Technical pentaerythritol can be purified by recrystallization from water and by separation in a centrifugal separator, as described in the now abandoned application of Blythe M. Reynolds, Serial No. 483,938, filed April 21, 1943; from the filtrate or mother liquor which results from the separation of monopentaerythritol from dipentaerythritol in such process, formaldehyde bipentaerythrityl acetal can be recovered.

We have also discovered that formaldehyde bipentaerythrityl acetal can be converted to pentaerythritol cyclic monoformal by reaction with acidic reagents such as aqueous hydrochloric acid.

We have further discovered that pentaerythritol cyclic monoformal may be recovered from end liquors resulting from the process of producing pentaerythritol by extraction with ethyl acetate.

We have further discovered that either of these formals can be converted into pentaerythritol and formaldehyde by heating them with dilute aqueous hydrochloric or sulfuric acid. The formaldehyde that is formed may be removed by distillation. Since the distillation requires a rather long period of time, it is convenient to hydrolyze the formal in the presence of a nitrogen compound such as phenylhydrazine, 2,4-dinitrophenylhydrazine, urea, or ammonium sulfate, to form pentaerythritol and respectively, a hydrazone, methylene urea or hexamethyenetetramine, as described in Example 8 hereinafter. The pentaerythritol can be recovered from the reaction products.

The reactions of these formals with an aqueous mineral acid can be written as follows:

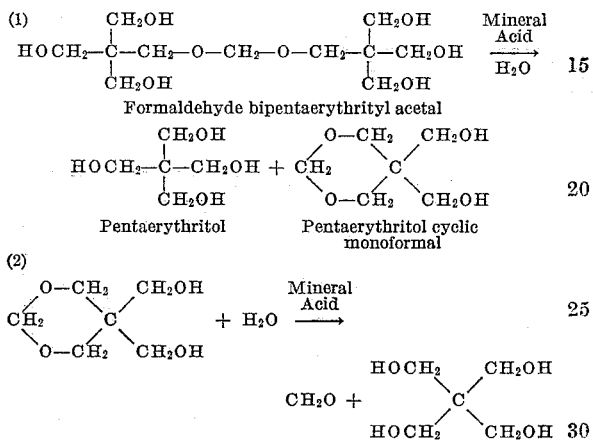

Two new acetates have been prepared from these formals. One is the hexaacetate of formaldehyde bipentaerythrityl acetal, having the following formula:

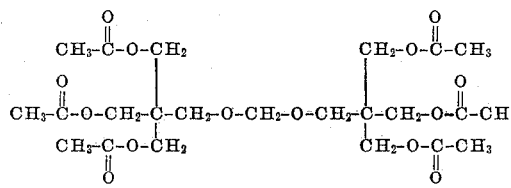

The other is the diacetate of pentaerythritol cyclic monoformal, having the following formula:

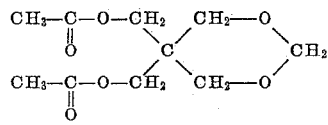

Results of determinations of molecular weights and ultimate analyses of the formals and acetates are given in the following tables:

Examples of methods of practicing the invention are illustrated in the examples which follow hereinafter.

*Example 1.—Isolation of formaldehyde bipentaerythrityl acetal*

When technical pentaerythritol is crystallized once from an equal weight of water, it is found that 12 to 14% of the material is soluble at 25° C. The calculated solubility, based on the respective solubilities of the mono and dipentaerythritol that are present, is about 8%. The remainder appears to be the formaldehyde bipentaerythrityl acetal described hereinabove. When a mother liquor or filtrate, such as that described hereinabove, containing 12 to 14% of dissolved material is evaporated to dryness and boiled up with 10 times its weight of n-propanol, the formaldehyde bipentaerythrityl acetal goes into solution in the n-propanol. Since pentaerythritol is only slightly soluble in n-propanol, a separation of the two is thereby effected. Upon concentration and chilling, fairly pure formaldehyde bipentaerythrityl acetal crystallizes out. This may be further purified by recrystallization from 1,4-dioxane.

*Example 2.—Isolation of formaldehyde bipentaerythrityl acetal*

One hundred (100) parts of technical pentaerythritol containing formaldehyde bipentaerythrityl acetal are mixed with 100 parts of n-butyl acetate and the mixture boiled for one hour. Approximately three (3) parts of formaldehyde bipentaerythrityl acetal are extracted. The formaldehyde bipentaerythrityl acetal can be separated by filtering off the pentaerythritol and concentrating and cooling the n-butyl acetate solution so as to crystallize out the formaldehyde bipentaerythrityl acetal.

*Example 3.—Isolation of pentaerythritol cyclic monoformal and conversion to the diacetate*

The end liquors obtained from the process of producing pentaerythritol were extracted with ethyl acetate, and the ethyl acetate separated from the extract by evaporation. A syrup remains which contains a small amount of water and sodium formate and probably some pentaerythritol. This syrup has a hydroxyl value of about 28% and a molecular weight of about 150 and is substantially pure pentaerythritol cyclic monoformal.

Twenty-five (25) parts of this syrup were re-

*Table I.—Formals*

| | Found | | | | Calculated | | | |
|---|---|---|---|---|---|---|---|---|
| | C | H | OH | Mol. Wt. | C | H | OH | Mol. Wt. |
| | Per cent | Per cent | Per cent | | Per cent | Per cent | Per cent | |
| Formaldehyde bipentaerythrityl acetal | 46.1 | 9.03 | 38 | 278 | 46.5 | 8.45 | 36.0 | 284 |
| Pentaerythritol cyclic monoformal | 46.9 | 8.86 | 25.1 | 149 | 48.6 | 8.12 | 23.0 | 148 |

*Table II.—Acetates*

| | Found | | | | Calculated | | | |
|---|---|---|---|---|---|---|---|---|
| | C | H | Sap.[1] Value | Mol. Wt. | C | H | Sap.[1] Value | Mol. Wt. |
| | Per cent | Per cent | Per cent | | Per cent | Per cent | Per cent | |
| Hexaacetate of formaldehyde bipentaerythrityl acetal | 51.5 | 7.15 | 11.34 | 492 | 51.5 | 6.72 | 11.2 | 536 |
| Diacetate of pentaerythritol cyclic monoformal | 51.2 | 7.46 | 8.56 | 251 | 51.7 | 6.90 | 8.62 | 232 |

[1] Saponification value.

acted with 54 parts of acetic anhydride. When the acetylation was complete, the excess acetic anhydride and the liberated acetic acid were removed by distillation under reduced pressure. The remaining material weighed 40.5 parts and had a saponification value of 9.2 cc. of normal sodium hydroxide solution per gram. This acetylated product was subjected to vacuum distillation and the fraction which distilled at 117 to 140° C. at a pressure of 0.4 mm. of mercury represented about 60% of the starting material. This distilled material is substantially pentaerythritol cyclic monoformal diacetate, which was confirmed also by molecular weight determinations and saponification values. Another sample of the diacetate had a boiling point of 110° to 111° C. at a pressure of 0.6 mm. (Example 7).

*Example 4.—Purification of crude pentaerythritol cyclic monoformal*

Crude pentaerythritol cyclic monoformal is purified in the following way: One (1) part of crude material is heated with 20 parts of benzene, using a trap built into a reflux condenser so that any water present can be removed azeotropically. The anhydrous, hot benzene solution is filtered so as to remove any sodium formate that is present. Upon cooling the benzene solution, the purified pentaerythritol cyclic monoformal crystallizes out and may be recovered by filtration. Care must be taken to eliminate moisture, as pentaerythritol cyclic monoformal is extremely hygroscopic.

*Example 5.—Preparation of hexaacetate of formaldehyde bipentaerythrityl acetal*

The hexaacetate of formaldehyde bipentaerythrityl acetal is prepared by acetylation of 15 parts of the acetal with 55 parts of acetic anhydride. This mixture is heated to 95° C., and then the excess acetic anhydride and the liberated acetic acid are removed by vacuum distillation. The residue is a crystalline, waxy solid consisting essentially of formaldehyde bipentaerythrityl acetal hexaacetate.

*Example 6.—Preparation of pentaerythritol cyclic monoformal by hydrolysis of formaldehyde bipentaerythrityl acetal*

A solution of 50 parts of formaldehyde bipentaerythrityl acetal (isolated as described in Examples 1 or 2, for example) in 100 parts of 10% hydrochloric acid was boiled under reflux for 2 hours. It was neutralized with 58 parts of a 10% sodium hydroxide solution and the mixture was evaporated to a paste under reduced pressure. This paste was treated with an equal weight of isopropanol and the solids which separated out were filtered off. The filtrate was evaporated to dryness and the residue was taken up in 180 parts of isopropanol. A new crop of crystals was removed. The two solid crystalline fractions had a combined weight of 42.2 parts, and consisted essentially of pentaerythritol mixed with some sodium chloride. The filtrate from the second crystallization was evaporated to dryness. The product was a syrup which had a hydroxyl value of 25.0%, and which crystallized on long standing. This material was impure pentaerythritol cyclic monoformal.

*Example 7—Conversion of pentaerythritol cyclic monoformal to the diacetate*

Eight (8) parts of crude pentaerythritol cyclic monoformal (obtained, for example, as described in Example 6) were treated with 25 parts of acetic anhydride. When acetylation was completed, the excess acetic anhydride and the liberated acetic acid were removed by evaporation under reduced pressure. The residue was distilled under reduced pressure and boiled at 100 to 111° C. at a pressure of 0.6 mm. of mercury. The distilled fraction was essentially pure pentaerythritol cyclic monoformal diacetate.

*Example 8—Reaction of formaldehyde bipentaerythrityl acetal with a hydrazine*

To one part of formaldehyde bipentaerythrityl acetal was added 50 parts of water, 50 parts of methanol, and a solution containing 1.4 parts of 2,4-dinitrophenylhydrazine which is 100% excess hydrazine over that required for combining with all the formaldehyde that is theoretically formed in the reaction. Ten (10) parts of 35% hydrochloric acid was added, and the mixture boiled under reflux for 2 hours. Upon cooling the mixture, a flocculent, orange brown solid settled out. It was the 2,4-dinitrophenylhydrazone of formaldehyde. The pentaerythritol can be recovered from the remaining solution after the removal of the hydrazone by filtration.

Pentaerythritol and formaldehyde can be prepared by boiling or heating formaldehyde bipentaerythrityl acetal and pentaerythritol cyclic monoformal with aqueous mineral acids such as sulfuric acid and hydrochloric acid, as described hereinbefore. The formaldehyde can be distilled from the reaction mixture and the pentaerythritol recovered from the residue. If desired, the boiling may be conducted in the presence of a nitrogen compound such as phenylhydrazine, 2,4-dinitrophenylhydrazine, urea or ammonium sulfate, which will react with the liberated formaldehyde. These reactions may be used as bases of analytical methods for determination of the proportion of formaldehyde bipentaerythritol acetal or pentaerythritol cyclic monoformal, for example, in substantially pure products, in technical pentaerythritol, or in pentaerythritol process end liquors. The liberated formaldehyde may be determined in conventional manner and the proportions of these formals calculated therefrom, or the formaldehyde may be precipitated with 2,4-dinitrophenylhydrazine and the resulting hydrazone weighed.

Inasmuch as the foregoing specification comprises preferred embodiments of the invention it is to be understood that the invention is not limited thereto and that modifications and variations may be made therein without departing substantially from the scope of the appended claims.

Having thus described our invention what we claim as new and desire to secure by Letters Patent is:

1. A process for the production of pentaerythritol cyclic monoformal which comprises the extraction of formaldehyde bipentaerythrityl acetal from a mixture containing said compound together with pentaerythritol and dipentaerythritol in substantially anhydrous form with a solvent selected from the group consisting of n-propanol, isopropanol and butyl acetate, recovering formaldehyde bipentaerythrityl acetal from the extract and thereafter heating said formaldehyde bipentaerythrityl acetal with such an amount of a mineral acid and at such temperature and for such period that the formaldehyde bipentaerythrityl acetal is converted to pentaerythritol cyclic monoformal, separating any pentaerythritol which was formed in the reaction, and thereafter recovering pentaerythritol cyclic monoformal from the remaining products.

2. A process for the production of pentaerythritol cyclic monoformal which comprises the extraction of formaldehyde bipentaerythrityl acetal from a mixture containing said compound together with pentaerythritol and dipentaerythritol in substantially anhydrous form with n-propanol, recovering formaldehyde bipentaerythrityl acetal from the extract and thereafter heating said formaldehyde bipentaerythrityl acetal together with approximately 100 parts by weight of 10% hydrochloric acid for a period of approximately 2 hours, neutralizing the resulting mixture with sodium hydroxide and evaporating the mixture to substantial dryness, extracting the substantially dry mixture with isopropanol to separate the pentaerythritol cyclic monoformal from pentaerythritol and sodium chloride, and subsequently recovering pentaerythritol cyclic monoformal from the isopropanol extract.

3. A process for the production of pentaerythritol cyclic monoformal which comprises the extraction of formaldehyde bipentaerythrityl acetal from a mixture containing said compound together with pentaerythritol and dipentaerythritol in substantially anhydrous form with butyl acetate, recovering formaldehyde bipentaerythrityl acetal from the extract and thereafter heating said formaldehyde bipentaerythrityl acetal together with approximately 100 parts by weight of 10% hydrochloric acid for a period of approximately 2 hours, neutralizing the resulting mixture with sodium hydroxide and evaporating the mixture to substantial dryness, extracting the substantially dry mixture with isopropanol to separate the pentaerythritol cyclic monoformal from pentaerythritol and sodium chloride, and subsequently recovering pentaerythritol cyclic monoformal from the isopropanol extract.

4. A process for the separation of formaldehyde bipentaerythrityl acetal from a mixture containing said compound together with pentaerythritol and dipentaerythritol, which comprises extracting said mixture in substantially anhydrous form with a solvent selected from the group consisting of n-propanol, isopropanol and butyl acetate, and recovering formaldehyde bipentaerythrityl acetal from the extract.

5. A process for the separation of formaldehyde bipentaerythrityl acetal from a mixture containing said compound together with pentaerythritol and dipentaerythritol, which comprises extracting said mixture in substantially anhydrous form with n-propanol, and recovering formaldehyde bipentaerythrityl acetal from the extract.

6. A process for the separation of formaldehyde bipentaerythrityl acetal from a mixture containing said compound together with pentaerythritol and dipentaerythritol, which comprises extracting said mixture in substantially anhydrous form with butyl acetate, and recovering formaldehyde bipentaerythrityl acetal from the extract.

7. A process for the production of pentaerythrityl cyclic monoformal, which comprises heating a mixture of formaldehyde bipentaerythrityl acetal with such an amount of a mineral acid and at such temperature and for such period that the formaldehyde bipentaerythrityl acetal is converted to pentaerythritol cyclic monoformal, separating any pentaerythritol which was formed in the reaction, and thereafter recovering pentaerythritol cyclic monoformal from the remaining products.

8. A process for the production of pentaerythritol cyclic monoformal, which comprises heating under gentle reflux approximately 50 parts by weight of formaldehyde bipentaerythrityl acetal together with approximately 100 parts by weight of 10% hydrochloric acid for a period of approximately 2 hours, neutralizing the resulting mixture with sodium hydroxide and evaporating the mixture to substantial dryness, extracting the substantially dry mixture with isopropanol to separate the pentaerythritol cyclic monoformal from pentaerythritol and sodium chloride, and subsequently recovering pentaerythritol cyclic monoformal from the isopropanol extract.

ROBERT H. BARTH.
JOHN E. SNOW.

REFERENCES CITED

The following references are of record in the file of this patent:

UNITED STATES PATENTS

| Number | Name | Date |
| --- | --- | --- |
| 2,223,421 | Hubacher et al. | Dec. 3, 1940 |
| 2,270,839 | Wyler | Jan. 30, 1942 |